United States Patent [19]

Andow et al.

[11] Patent Number: 4,561,120

[45] Date of Patent: Dec. 24, 1985

[54] PROTECTIVE RELAYING SYSTEM

[75] Inventors: Fumio Andow, Hachioji; Junichi Inagaki, Fuchu, both of Japan

[73] Assignee: Tokyo Shibaura Denki Kabushiki Kaisha, Kawasaki, Japan

[21] Appl. No.: 585,202

[22] Filed: Mar. 1, 1984

[30] Foreign Application Priority Data

Mar. 4, 1983 [JP] Japan ................... 58-35525

[51] Int. Cl.⁴ ............................... H02H 3/28
[52] U.S. Cl. ................. 455/612; 455/607; 361/68; 361/81
[58] Field of Search ........ 361/67, 68, 64, 66, 361/81; 307/96, 97; 455/600, 612, 607; 364/483

[56] References Cited

U.S. PATENT DOCUMENTS 4,228,476 10/1980 Okita et al. ............... 361/68

FOREIGN PATENT DOCUMENTS 56-42216 10/1981 Japan .
57-9292 2/1982 Japan .

OTHER PUBLICATIONS

Transaction No. 1083 of the Institute of Electrical Engineers of Japan in 1981 Nationwide Convention, entitled "Current Differential Protective Relaying System Utilizing Optical PCM Transmission".

Primary Examiner—Robert L. Griffin
Assistant Examiner—Timothy K. Greer
Attorney, Agent, or Firm—Oblon, Fisher, Spivak, McClelland & Maier

[57] ABSTRACT

A protective relaying system in which the electric stations at both ends of a district of a power system to be protected optically transmit and receive reciprocally the information of the electric stations. A first protective relay device responds to both the electrical quantities from the opposite side terminal and electrical quantities of its own side terminal, and a second protective relay device responds only to the electrical quantities of its own side terminal. The respective protective relay devices are controlled by virtue of error detection circuits and signal discontinuity detection circuits connected to the optical transmission line to thereby discriminating the mere failure in the optical transmission line from the concurrent failures in both the optical transmission line and the transmission line so as to rapidly eliminate the failures.

9 Claims, 11 Drawing Figures

PROTECTIVE RELAYING SYSTEM

BACKGROUND OF THE INVENTION

1. Field of the Invention

This invention relates to a protective relaying system, and more particularly to a protective relaying system which protects a power system on the basis of terminal information quantities received at respective electric stations and reciprocally communicated by means of optical transmission.

2. Description of the Prior Art

In recent years, the technology of utilizing optical communication lines supported by optical fibers as information transmission routes has pervaded even the field of protective control engineering. Signal transmission by means of optical transmission has significant advantages such as freedom from adverse environmental influences, particularly from electromagnetic disturbances. Thus, applications to protective relaying systems have been projected in which highly reliable information transmission is indispensable. This projected system utilizing optical transmission will be described with reference to FIG. 1 illustrating the skeleton diagram thereof. Although the diagram is illustrated for an electric station A, a similar structure is also used for an electric station B.

In FIG. 1, characters $S_A$ and $S_B$ represent background power sources of the 1st and 2nd electric stations A and B, respectively. Currents $I_A$ and $I_B$ which flow into the terminals of the respective 1st and 2nd electric stations A and B connected by means of a transmission line 1 are respectively converted by current transformers $2_A$ and $2_B$ into signals $S_0$ and $S_0'$ suitable to be processed in the following protective circuits. The output signal $S_0$ from the current transformer $2_A$ is fed into a protective relay $3_A$. The protective relay $3_A$ is a failure district detection relay that receives the electrical quantities of both the terminals of the transmission line 1 and operates when a failure occurs on the transmission line 1 to be protected (to be more strict, on a portion of the transmission line inside the installation point of the current transformers $2_A$ and $2_B$). The protective relay $3_A$ is, for example, a current differential relay or a phase comparison relay. A current differential relay will be described herein. The protective relay $3_A$ utilizes the signal $S_0$ for operation judgment and also transmits it through an optical transmission line 4 to the opposite terminal. To perform this optical transmission, the protective relay 3A converts the signal $S_0$ into a signal $S_1$ so as to meet the specified input condition of a PCM (pulse code modulation) optical terminal device $5_A$, and outputs the signal $S_1$ to the optical terminal device $5_A$. The optical terminal device $5_A$ mixes the signals $S_1$ so as to produce a multiplex signal, and, in turn, converts the multiplex signal into an optical signal $S_2$ for outputting the optical signal $S_2$ to an optical transmission line 4. Further, the optical terminal device $5_A$ converts an optical signal $S_3$ received through the optical transmission line 4 from an electric station B into an electrical signal, and also separates the multiplexed electrical signal so as to produce a signal $S_4$, then outputs the separated signal $S_4$ to the protective relay 3A. The signal $S_4$ is also fed into an error detection circuit $6_A$ which will later be described in detail. The protective relay 3A converts the received signal $S_4$ into the specified signal level therein and compares this converted signal with the signal $S_0$ of its own electric station so as to judge whether to operate with respect to the instantaneous value of the current. When the protective relay $3_A$ judges whether it is to operate, i.e., if there exists a failure on the transmission line 1, it then produces an output signal $S_5$ which is a trip-enabling signal.

On the other hand, the error detection circuit $6_A$ receives the signal $S_4$ so as to monitor whether abnormalities exist in the signal $S_4$, that is, in the optical transmission line 4, and when any fault is detected, the circuit $6_A$ outputs a relay lock signal $S_6$ that inhibits the relay output signal $S_5$. An inhibit circuit $7_A$ receives the relay output signal $S_5$ and the relay lock signal $S_6$, and in case the relay output signal $S_5$ is "1" while the relay lock signal $S_6$ is "0", i.e., when the circuit $7_A$ establishes logical output "1", then outputs a trip output signal $S_7$ so as to trip a power circuit breaker $8_A$. Thus, in this system, when the error detection circuit $6_A$ detects abnormalities in the signal $S_4$, the circuit $6_A$ outputs the relay lock signal $S_6$ as "1" to the inhibit circuit $7_A$ so as to inhibit the trip of the power circuit breaker $8_A$ (a so-called trip-lock).

The above-described protective relaying system are provided as in the following prior art.

1. The technology disclosed in the transactions No. 1081 of the Institute of Electrical Engineers of Japan in 1981 nationwide convention entitled "FM carrier current differential relay by means of optical transmission".

This discloses the system of a so-called FM carrier current differential relay in which the input and output signals $S_1$ and $S_4$ of the protective relay 3 in FIG. 3 are such FM (frequency modulation) signals that the carrier waves thereof are modulated by the system current signals, and a PCM 24 terminal device is utilized as an interface of the optical terminal device $5_A$. For the operation judgment in the protective relay $3_A$, analog signals are used, and the error detection circuit $6_A$ monitors abnormalities of the FM signals on the basis of either detection of out-range frequencies or comparison of periods of FM signals adjacent with one another, so as to detect abnormalities in the signal transmission system.

2. The technology disclosed in Japanese Patent Publication No. 57-9292.

This discloses the system in which the input and output signals $S_1$ and $S_4$ of the protective relay $3_A$ are of signals digitally coded, and sampling of these signals is performed in synchronism with each other at the respective electric stations, and then the digitally coded current information are reciprocally transmitted. As for the error detection method in the error detection circuit $6_A$, there are utilized well-known methods such as level-lowering detection, parity check, cyclic code detection, and dual-simultaneous reference.

3. The technology disclosed in the transactions No. 1083 of the Institute of Electrical Engineers of Japan in 1981 nationwide convention entitled "Current differential protective relaying system utilizing optical PCM transmission".

This discloses the system in which the current information of a sub-electric station is digitized and optically transmitted to the main electric station. On the other hand, in the main electric station, the digital signals are converted into analog signals, and by utilizing the analog signals, the operation judgment based on the current differential protection method is performed. The result of this judgment is transmitted to the subelectric station by means of optical transmission. In the error detection circuit 6, failures in optical transmission are detected on the basis of the signal pattern tests and the detection of a signal lose.

In either system of the above-described conventional protective systems, when a failure of signal transmission system occurs in the transmission process, the output of trip circuit is inhibited, and this prevents mistrip of the interrupter even when the protective relay is erroneously operated by the effect of failures in the relay input information. This preventive procedure solves the problem as to a temporary failure of signal transmission system, however, there still exist problems with continuous failures in the information transmission routes such as damage or burn-out of optical cables.

Such problems include, as described with reference to FIG. 1, that when a failure continues, then the trip-lock also continues. Thus, should a system failure occur during this trip-lock, the elimination of such system failure inevitably depends upon the back-up protection. However, the failure elimination by virtue of power circuit breaker-trip which depends upon the back-up protection unintentionally produces a time-delay compared to that performed by a power circuit breaker-trip based on the main protection because the trip is made in a time-limit trip fashion. This time delay in elimination of failure could be hazardous, depending upon the degree of the failures. A distance relay, which is set in a first zone and which is one of the back-up protection relays, sometimes trips instantaneously. However, this distance relay covers approximately 80% of the entire length of the transmission line up to the opposite side bus of a district to be protected. Thus, the system failure in the remaining district of 20%, that is, in the vicinity of the opposite side bus, does not cause the first stage distance relay to be operated.

Furthermore, there are also other problems as follows. At present, such a method has been put into practical use both domestic and abroad, whereby optical fibers for use in optical transmission are incorporated within the overhead ground wires of the transmission lines. The use of optical fiber-compound overhead ground wires need not prepare exclusive routes for optical fibers, so that it is extremely economical. However, in such system structure, in the case of accidents such as steel-tower destruction, fire or destruction by earthquake and the like, the optical transmission is stopped at substantially the same time to the occurrence of the system failure. Therefore, despite the occurrence of the system failure, the relay is unintentionally locked, so that the elimination of the system failure inevitably depends upon the back-up protection relay. Further, in the case of co-installation of optical fibers within the transmission lines, for example, within underground transmission conduit, there also exist the same problems.

Moreover, in optical transmission, such redundant dual structures have generally been employed that optical fibers and optical terminal devices are provided in dual so as to make changeover upon occurrence of failures in the optical transmission, however, this does not serve as a countermeasure in the case of the aforementioned accidents such as steel-tower destruction, fire, or destruction caused by earthquake.

SUMMARY OF THE INVENTION

Accordingly, one object of the present invention is to provide a protective relaying system capable of rapidly eliminating the system failure even when the power system failure and the failure of optical transmission lines occur simultaneously in a protection system which transmits to and receives from the electric stations electrical quantities information by means of optical transmission thereby detecting a fault district so as to perform a protective operation.

In accordance with the present invention, to achieve the above-described object, there is provided, a first protective relay device which responds to both the electrical quantities from the opposite side terminal and the electrical quantities of its own side terminal, and a second protective relay device which responds only to the electrical quantities of its own side terminal. The respective protective relay devices are controlled by virtue of error detection circuits and signal discontinuity detection circuits connected to the optical transmission lines, thereby discriminating the mere failure in the optical transmission lines from the concurrent failures in both the optical transmission lines and the transmission line so as to rapidly eliminate the failures.

BRIEF DESCRIPTION OF DRAWINGS

A more complete appreciation of the invention and many of the attendant advantages thereof will be readily obtained as the same become better understood by reference to the following detailed description when considered in connection with the accompanying drawings wherein:

FIG. 3(a) shows the case where a failure has occurred only on the transmission line, FIG. 3(b) the case where only transmission signal discontinuity has occurred, FIG. 3(c) the case where the failure on the transmission line and in the transmission signal discontinuity have concurrently occurred, respectively;

DESCRIPTION OF THE PREFERRED EMBODIMENTS

Figure 1:
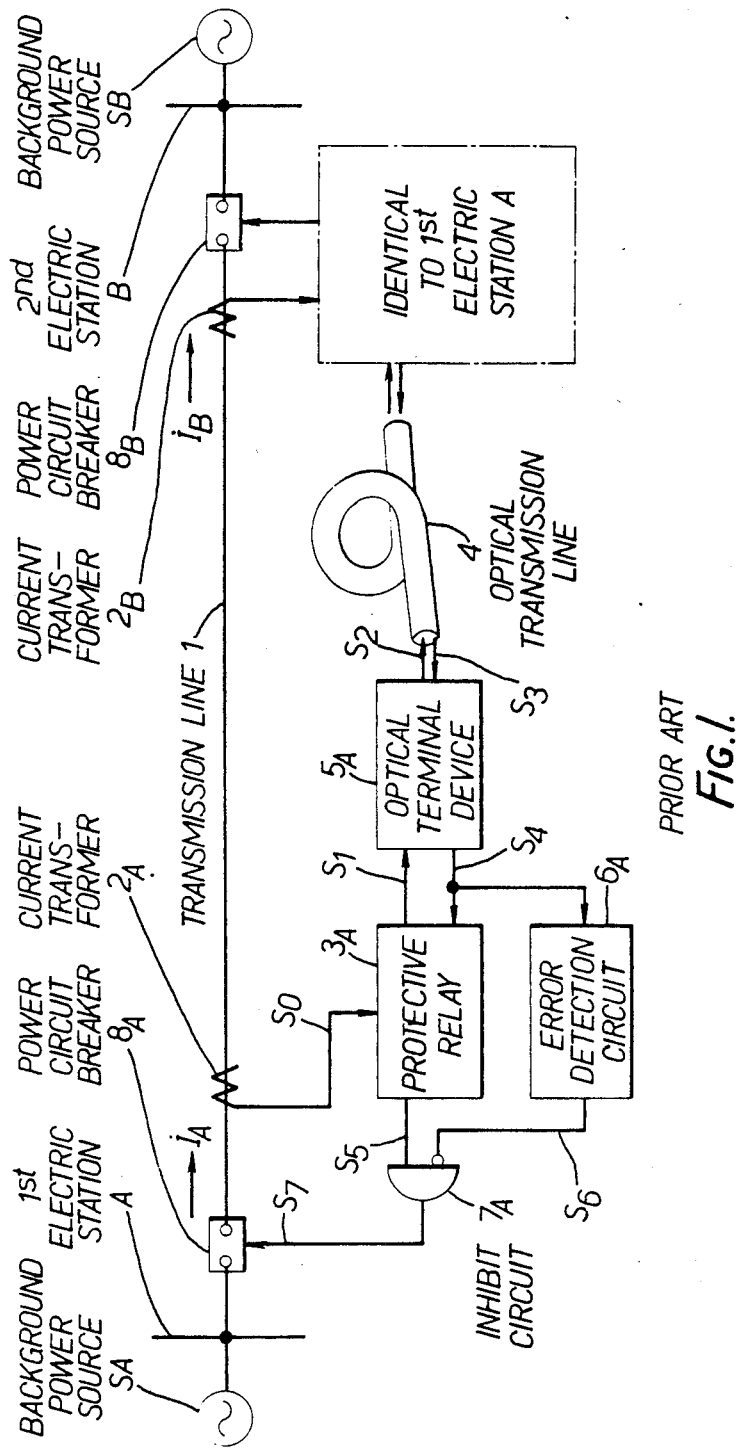
FIG. 1 is a skeleton diagram of a protective relaying system in conventional structure utilizing optical transmission lines.
Figure 2:
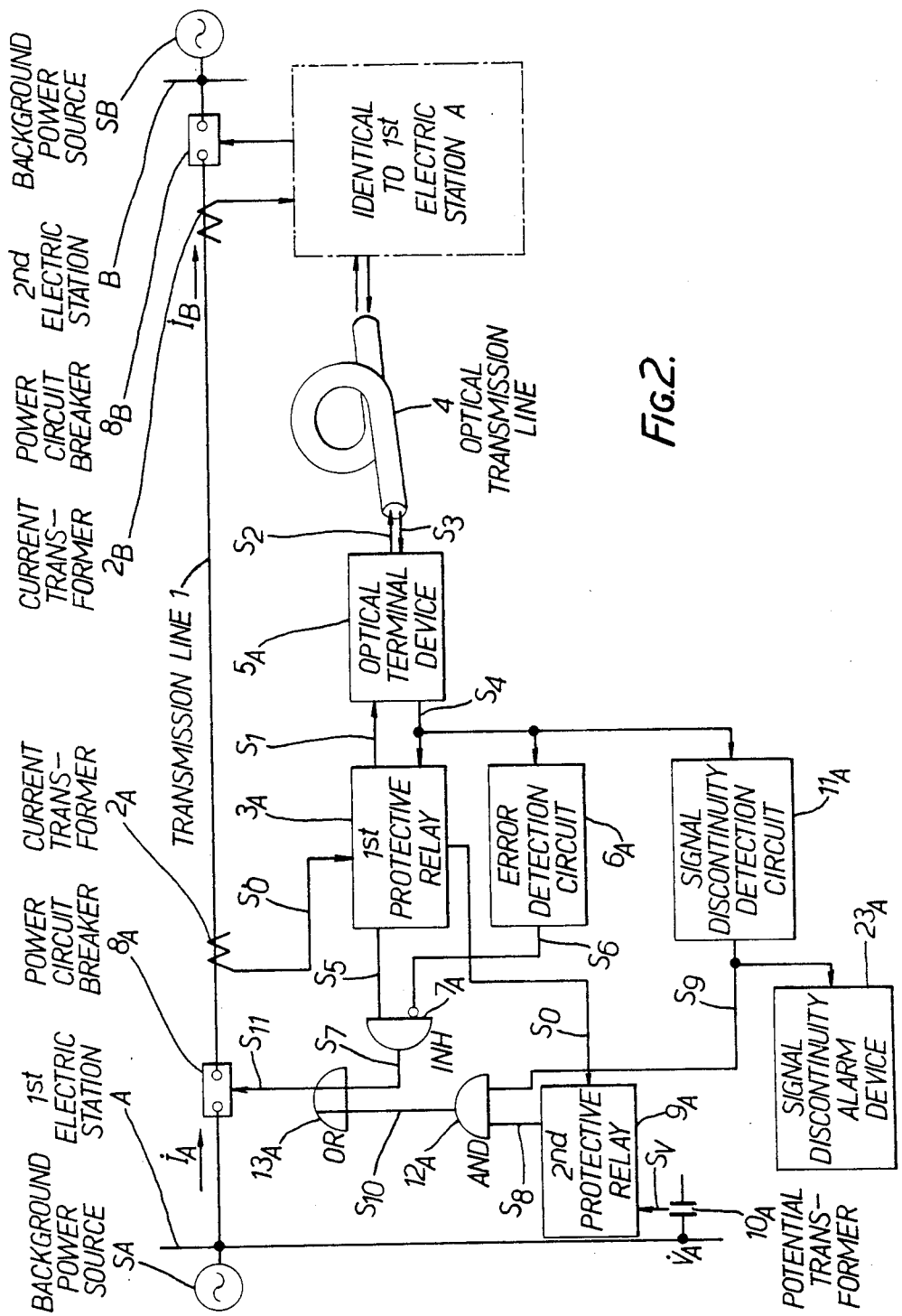
FIG. 2 is a schematic diagram illustrating one embodiment of a protective relaying system according to the present invention.

Referring now to FIG. 2 illustrating an embodiment of a protective relaying system according to the present invention, there is shown a skeleton diagram with respect to a 1st electric station A, however, 2nd electric station B is naturally of same in structure. In FIG. 2, like reference numerals represent parts identical in function as those in FIG. 1. Reference numeral $9_A$ represents a protective relay, such as a distance relay which receives the signal $S_o$ corresponding to the current $\dot{I}_A$ and the signal $S_v$ corresponding to the voltage $\dot{V}_A$ respectively through a current transformer $2_A$ and a potential transformer $10_A$, and judges whether or not a failure point lies within an operational region. The operational region is determined so as to at least cover the entire length of the transmission line 1 (the transmission line between the electric stations A and B). Here, in order to discriminate the protective relay $9_A$ from the protective relay $3_A$, hereinafter, the former will be called the second protective relay $9_A$, the latter the first protective relay $3_A$, respectively. When judgment is made to perform an operation, the second protective relay $9_A$ outputs an operation output signal $S_8$. When a signal discontinuity detection circuit $11_A$ receives a signal $S_4$ from an optical terminal device $5_A$, and detects the discontinuity of the signal $S_4$, the circuit $11_A$ then outputs an enabling signal $S_9$. The enabling signal $S_9$ is fed, as described later, into a signal discontinuity alarm device $23_A$. AND circuit $12_A$ receives the operation output signal $S_8$ from the second protective relay $9_A$ and the enabling signal $S_9$ from the signal discontinuity detection circuit $11_A$, and when both the signals $S_8$ and $S_9$ are in "1" state, the AND circuit $12_A$ then outputs a trip output signal $S_{10}$. OR circuit $13_A$ receives a trip output signal $S_7$ and the trip output signal $S_{10}$, and when either one of the signals is in "1" state, OR circuit $13_A$ then outputs a trip signal $S_{11}$ so as to trip a power circuit breaker $8_A$. The structures otherwise described above are identical to those shown in FIG. 1, so that the descriptions thereof are omitted.

The response principle of the second protective relay $9_A$ may be derived from the principle of the conventional well-known distance relay, which is considered as the mho characteristics which can be expressed in the following judgment equation;

$$|\dot{Z}/2\dot{I}| - |\dot{V} - \dot{Z}/2\dot{I}| - K_o \geq 0 \tag{1}$$

where,
$\dot{V}$: voltage input (signal $S_v$).
$\dot{I}$: current input (signal $S_0$).
$\dot{Z}$: setting value corresponding to the system impedance.
$K_0$: constant.

For the signal discontinuity detection circuit $11_A$, the conventional well-known detection method of transmission system signal discontinuity may be utilized, and some of the examples thereof will be hereinafter described.

In the case where the first protective relay $3_A$ is of an FM-carrier current differential relay, the signal discontinuity of the FM signal may be detected according to the peak value detection method with respect to FM signal waveforms disclosed in Japanese Patent Publication No. 56-42216. In this method, the signal discontinuity is detected by detecting that the peak value of the FM signal becomes smaller than the predetermined value. When the input signals $S_1$ and $S_4$ of the relay first protective $3_A$ are pulse signals of a so-called PCM carrier current differential relay, such a method has been generally utilized that a synchronized pattern which invariably includes "1" signals is employed, or that "1" signals are inserted at every specified bit. Namely, the method employs such a signal transmission format as not to have a continuous "0" state of pulse signals. Thus, when "0" signals continue for longer than the specified period, this can be judged as the signal discontinuity. This signal discontinuity detection method is conventionally used and well-known for those skilled in the art, so that detailed descriptions of the circuit configurations are omitted.

Next, the operations in the respective cases will be described.

First, the case where the optical transmission system comprised of an optical transmission line 4 and an optical terminal device $5_A$ operates in normal condition will be described. In this case, because the entire optical transmission systems are in normal operation, the relay lock signal $S_6$ is not outputted from the error detection circuit $6_A$, so that the output signal $S_5$ of the first protective relay $3_A$ may be outputted from the inhibit circuit $7_A$. The enabling signal $S_9$ is not outputted from the signal discontinuity detection circuit $11_A$, so that the AND circuit $12_A$ inhibits the output signal $S_8$ of the second protective relay $9_A$. Thus, in the case where the optical transmission systems are in a normal condition, in the same manner as in the conventional structure, the first protective relay $3_A$ judges whether or not a failure occurs in the power system to be protected, and when it judges that a failure has occurred, the relay $3_A$ then produces the output signal $S_5$ that causes the inhibit circuit $7_A$ to produce the trip output signal $S_{11}$.

Second, in the case of occurrence of errors (errors in data) in transmission signal caused by noises and the like, the error detection circuit $6_A$ detects failures, then the relay lock signal $S_6$ is produced so as to inhibit the output of the inhibit circuit $7_A$. This is performed in the same manner as in the conventional method. On the other hand, the signal discontinuity detection circuit $11_A$ does not judge the error of the transmission signal as a signal discontinuity so that the enabling signal $S_9$ is not outputted for the AND circuit $12_A$ which results in the inhibiting of the output of the trip signal $S_{10}$ from the AND circuit $12_A$. Therefore, in the case of occurrence of errors in transmission signal, in the same manner as in the conventional method, the occurrence of the signal $S_7$ based on the operation of the first protective relay $3_A$ is inhibited only within the period in which such errors occur, so that false operations caused by data errors may be prevented.

Figure 3A:
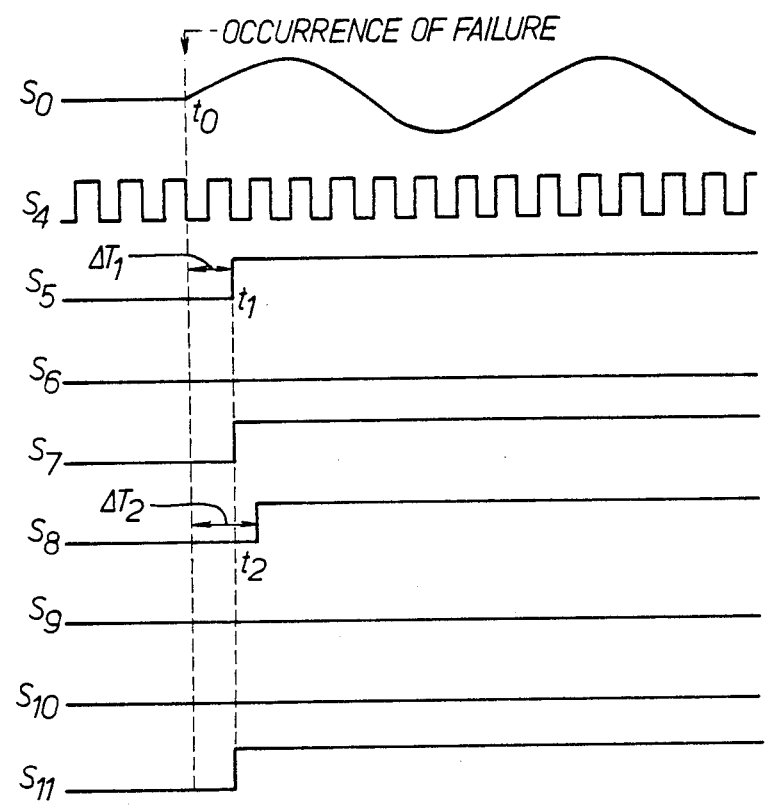
FIG. 3(a) through 3(c) are diagrams of time charts to explain operations upon occurrence of failures.
Figure 3B:
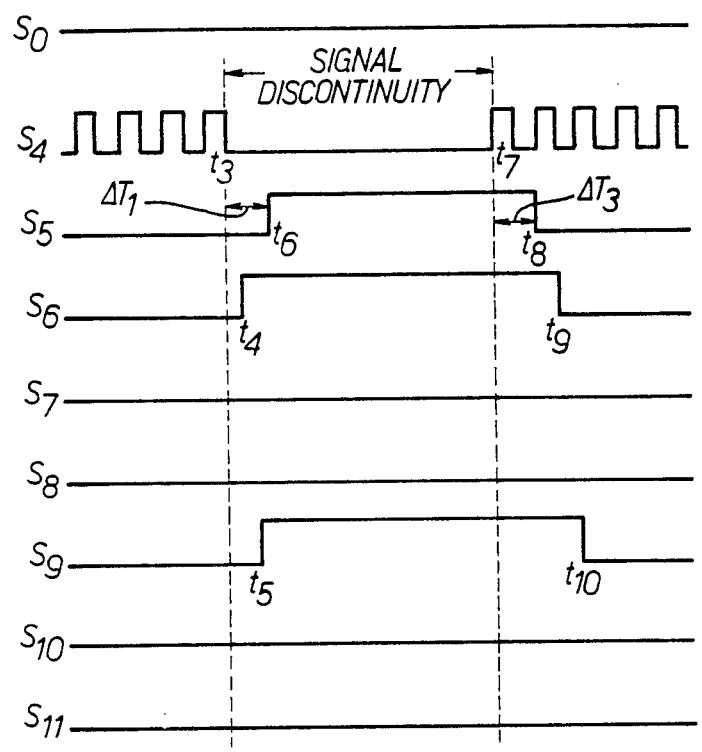
Figure 3C:
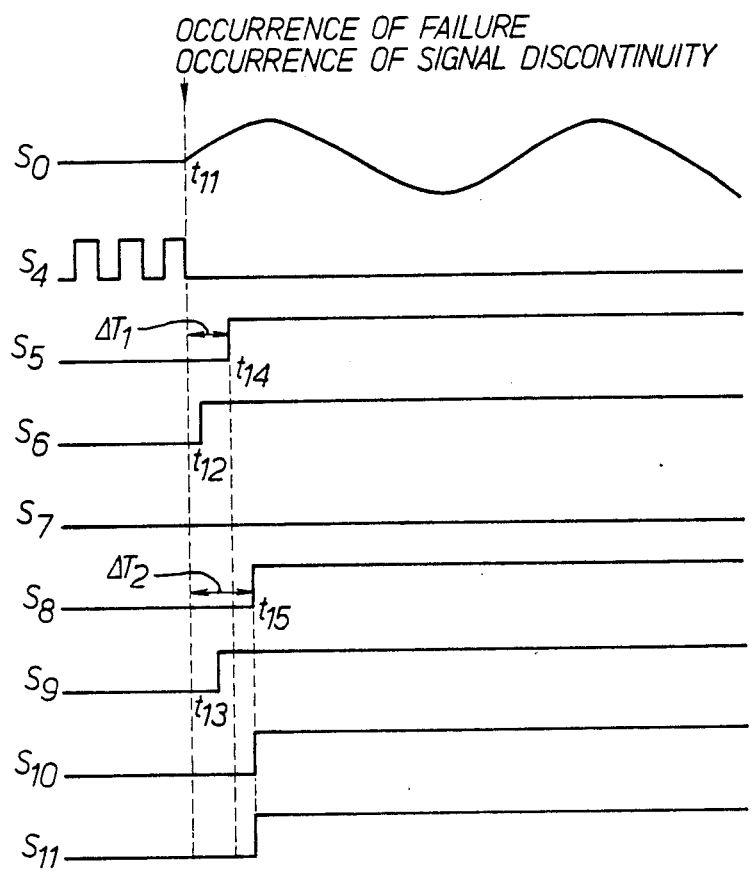

FIGS. 3(a), 3(b) and 3(c) are diagrams illustrating time charts to explain the operations upon occurrence of both failures and transmission signal discontinuity. Specifically, FIG. 3(a) shows the case where only the transmission line failure has occurred, FIG. 3(b) the case where only the transmission signal discontinuity has occurred, FIG. 3(c) the case where the failure of the transmission line and the transmission signal discontinuity have simultaneously occurred, respectively. Here, the signal $S_4$ outputted from the optical terminal device $5_A$ is shown with an example of a PCM signal.

FIG. 3(a) shows the case when a failure occurs on the transmission line 1 at a time $t_0$, then the current transformer $2_A$ produces a fault current as the output signal $S_0$ and the input signal $S_4$ to be fed into the first protective relay $3_A$ is in a normal condition. Therefore, both the error detection circuit $6_A$ and the signal discontinuity detection circuit $11_A$ perform no responding operation, and the first protective relay $3_A$ produces the relay output $S_5$ at a time $t_1$ which is delayed by the time $\Delta T_1$ (operation time) which is required by the relay $3_A$ in order to respond. In this case, since the signal $S_4$ is in a normal condition, the relay lock signal $S_6$ of the error detection circuit $6_A$ still remains as "0" so that the trip output signal $S_7$ and the signal $S_{11}$ become "1" at the same time at which the relay output signal $S_5$ is produced.

On the other hand, when the second protective relay $9_A$ detects occurrence of a failure, the protective relay $9_A$ produces the relay output signal $S_8$ at a time $t_2$ which is delayed by the operation time $\Delta T_2$ of the second protective relay $9_A$. However, since the signal $S_4$ is normal, the signal discontinuity detection circuit $11_A$ does not produce the a enabling signal $S_9$ of "1", i.e., $S_9$ remains as "0". Thus, the trip output signal $S_{10}$ remains as "0", and the power circuit breaker $8_A$ is tripped by the trip output signal $S_7$.

FIG. 3(b) shows the case where a signal discontinuity occurs during the period between a time $t_3$ and a time $t_7$. When the signal discontinuity occurs, the first protective relay $3_A$ causes the relay output signal $S_5$ to be changed to "1" from "0" at a time $t_6$ which is delayed from the time $t_3$ by the operation time $\Delta T_1$. Furthermore, at a time $t_8$ which is delayed from the time $t_7$ by the operation time $\Delta T_3$, the protective relay $3_A$ causes the relay output signal $S_5$ to be returned to "0" from "1". On the other hand, due to the discontinuity of the signal $S_4$, the error detection circuit $6_A$ causes the relay lock signal $S_6$ to be changed to "1" from "0" at a $t_4$, and upon recovery of signal discontinuity, at a time $t_9$ the circuit $6_A$ causes the signal $S_6$ to be returned to "0" from "1". The signal discontinuity detection circuit $11_A$ causes the enabling signal $S_9$ to be changed to "1" from "0" at a time $t_5$, and at a time $t_{10}$ the circuit $11_A$ causes the signal $S_9$ to be returned to "0" from "1". The state "1" of the relay lock signal $S_6$ and the state "1" of the enabling signal $S_9$ appear earlier than the state "1" of the relay output $S_5$, so that there exists a relationship such that $t_4 < t_5 < t_6$.

When the signal discontinuity is recovered, the return of the relay lock signal $S_6$ and the enabling signal $S_9$ appear later than the time $t_8$, and in general there exists such a relationship that $t_8 < t_9 < t_{10}$. Therefore, even when operations of the relay output signal $S_5$ occur during the period between the time $t_6$ through the time $t_8$ the relay lock signal $S_6$ continues the state "1", so that the trip output signal $S_7$ remains as "0". Further, even when a signal discontinuity of the signal $S_4$ occurs, the input of the second protective relay $9_A$ remains normal, so that the output signal $S_8$ of the second protective relay $9_A$ remains as "0". This causes the AND circuit $12_A$ not to produce the trip output signal $S_{10}$ despite the fact that the enabling signal $S_9$ continues as "1" during the period between the time $t_5$ through the time $t_{10}$. As described above, since both the trip output signal $S_7$ and the trip output signal $S_{10}$ remain as "0", the signal $S_{11}$ remains as "0". Here, the enabling signal $S_9$ is also fed into a signal discontinuity alarm device $23_A$, so that when a signal discontinuity is detected, the signal discontinuity alarm device $23_A$ operates so as to inform an operator within the electric station. As a result, the thus informed operator may take such a step as to manually lock the operation of the second protective relay $9_A$. This step of locking the operation of the second protective relay is not necessarily needed, however, in the case where a power system failure occurs on the power source SB side of the electric station B after a certain period from the time at which a signal discontinuity is detected. This prevents a possible mistrip caused by the second protective relay $9_A$.

FIG. 3(c) shows the case where a failure on the transmission line 1 and a discontinuity of the signal $S_4$ occur simultaneously at a time $t_{11}$. Due to the discontinuity of the signal $S_4$, the relay lock signal $S_6$ from the error detection circuit $6_A$ becomes "1" at a time $t_{12}$, and the enabling $S_9$ from the signal discontinuity detection circuit $11_A$ also becomes "1" at a time $t_{13}$. On the other hand, the first protective relay $3_A$ produces the relay output signal $S_5$ of "1" at a time $t_{14}$ which is delayed by the operation time $\Delta T_1$ from the time $t_{11}$ of failure occurrence, however, at this instant the relay lock signal $S_6$ remains as "1", so that the trip output signal $S_7$ remains as "0". However, responding to the failure, the second protective relay $9_A$ produces the relay output signal $S_8$ of "1" at a time $t_{15}$ which is delayed by the operation time $\Delta T_2$ from the time $t_{11}$ of the occurrence of a failure. Thus, at the time $t_{15}$ the trip output signal $S_{10}$ becomes "1", so that the output signal $S_{11}$ becomes "1" so as to cause the power circuit breaker $8_A$ to be tripped. This means that should a steel-tower destruction or a similar accident occur resulting in substantial concurrence of the signal discontinuity and the failure on the transmission line, the second protective relay $9_A$ would detect such failure so as to cause the power circuit breaker $8_A$ to be tripped. Similar operations are also performed within the electric station B so as to trip the power circuit breaker $8_B$.

Figure 4:
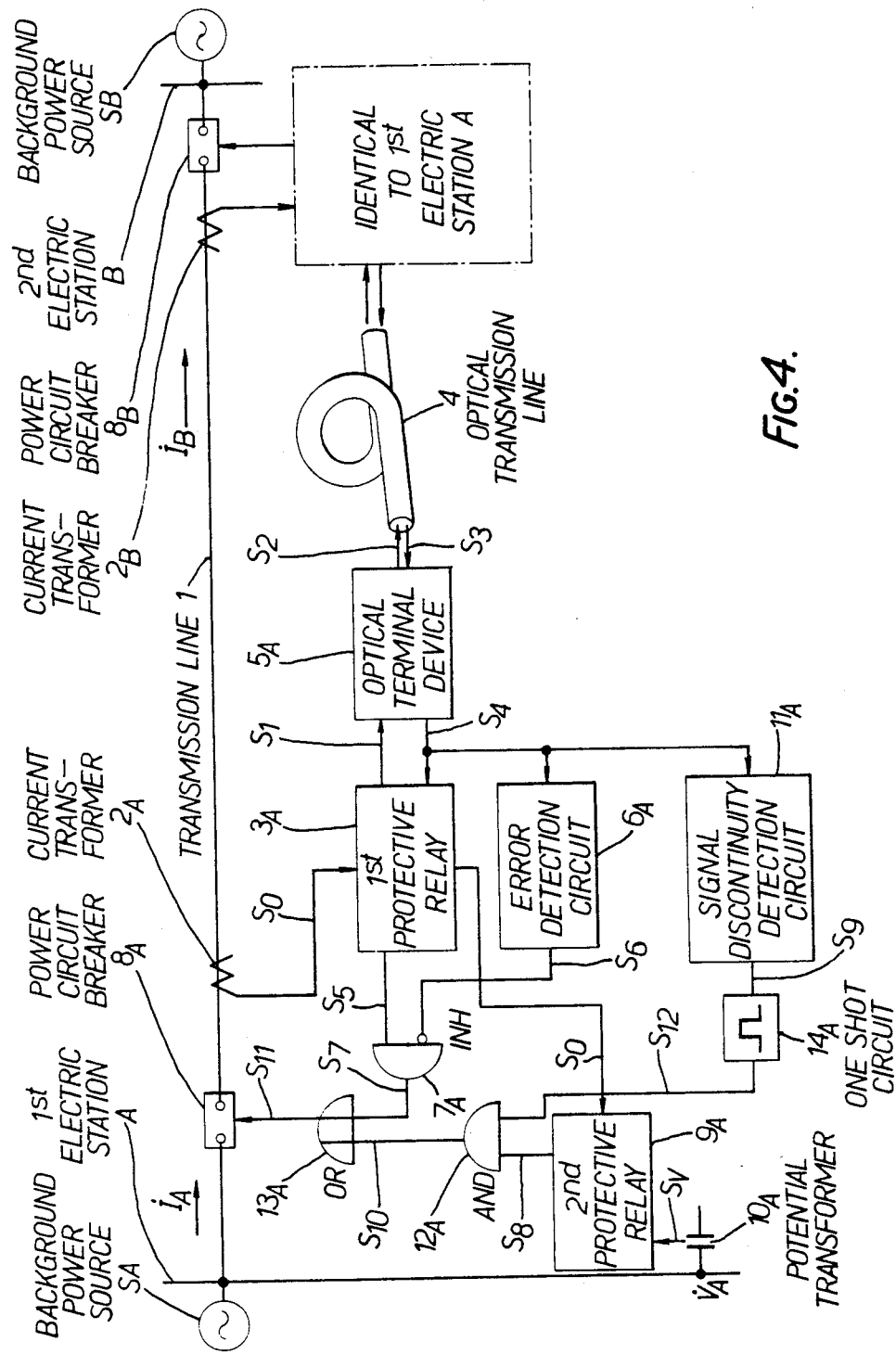
FIG. 4 is a schematic diagram illustrating another embodiment of a protective relay according to the present invention.

FIG. 4 is a schematic diagram of another embodiment of a protective relaying system according to the present invention. In this embodiment, only during a specified period (such as $T_M$ in FIG. 5) after a signal discontinuity detection performed by a signal discontinuity detection circuit $11_A$, an output $S_8$ of a second protective relay $9_A$ is caused to be outputted, thereby instantaneously eliminating a failure in the case of concurrence of failures both in optical transmission signal and in power transmission system, i.e., in such incidents as destruction of steel towers provided with optical-fiber combined overhead ground wires, or destruction of underground transmission lines caused by earthquake.

In FIG. 4, reference numerals 1 through $13_A$ are all corresponding to those in FIG. 2, and the difference is only that there is inserted a one shot circuit $14_A$ between the signal discontinuity detection circuit $11_A$ and an AND circuit $12_A$. The one shot circuit $14_A$ produces an output signal $S_{12}$ only for a specified period (one shot time, i.e., $T_M$ in FIG. 5) after reception of an enabling signal $S_9$ from the signal discontinuity detection circuit $11_A$.

As can be seen, the output signal $S_8$ of the second protective relay $9_A$ is inhibited after the specified period $T_M$, so that it is not necessary to take into consideration the protective cooperation with a subsequent district.

The above-described structure is provided so that because the operational region of the second protective relay $9_A$ covers the entire district of the transmission line 1, it is necessary to include a part of the subsequent district (the district between the electric station B and the power source SB in FIG. 4) which takes errors of the operation limits into consideration. Thus, the second protective relay $9_A$ tends to instantaneously operate by responding even to a failure in the subsequent district. In this case, the operation of the second protective relay $9_A$ is an unnecessary operation, and should be avoided. To overcome this, it can be considered to take such a protective action so that the instant at which the second protective relay $9_A$ outputs the trip signal appears later than the instant at which a relay in the subsequent district outputs a trip signal with respect to the failure in the subsequent district. However, should such a protective action, derived from the time difference, be employed, the instant at which the interrupter is tripped is inevitably delayed when a failure on the transmission line 1 and a failure on the optical transmission line 4 occur substantially simultaneously. On the other hand, such a probability can be neglected on the basis of the past experience that when a signal discontinuity is detected, a power system failure in the subsequent district can occur within a short period thereafter. Therefore, this embodiment features the above-described characteristics as follows. Namely, the period in which the second protective relay $9_A$ detects a failure and outputs a trip signal is designed to be limited only to a short time such as the period $T_M$ after a signal discontinuity detection is performed. This is based on the concept that the period $T_M$ may be designated as the time between the occurrence a signal discontinuity caused by accidents such as a steel-tower destruction and the occurrence of a ground short circuit of the transmission line.

Figure 5:
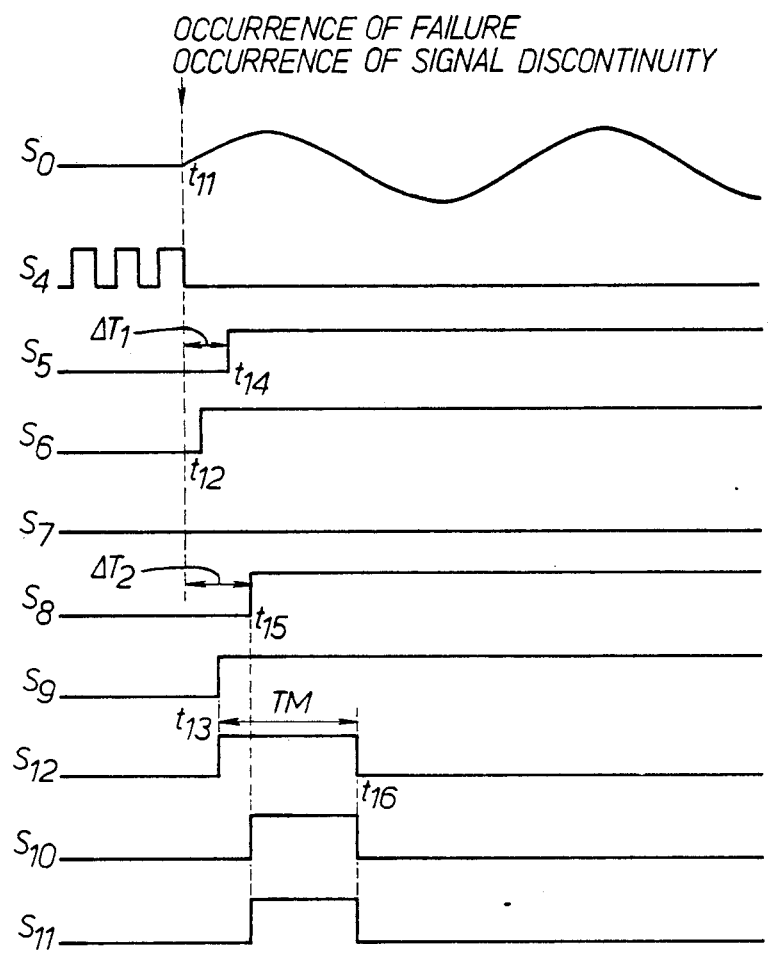
FIG. 5 is a time chart to explain the operations of the embodiment shown in FIG. 4.

FIG. 5 is a diagram illustrating a time chart to explain the operations in the case where at a time $t_{11}$, a failure on the transmission line 1 and the discontinuity of the signal $S_4$ occur simultaneously.

The difference between the time charts of FIG. 5 and of FIG. 3(c) is only that the output signal $S_{12}$ of the one shot circuit $14_A$ is added, and thereby the trip output signals $S_{10}$ and $S_{11}$ are changed.

In the time chart, the output signal $S_{12}$ remains as "1" from the time $t_{13}$ at which the signal discontinuity detection circuit $11_A$ outputs the enabling signal $S_9$ to the time $t_{16}$ which is delayed by the one shot time $T_M$. Here, relay $9_A$ operates at a time $t_{15}$ which is between the times $t_{13}$ and $t_{16}$, and the trip output signal $S_{10}$ depends on the AND circuit $12_A$, so that the output signal $S_{11}$ becomes "1" during the period between the times $t_{15}$ and $t_{16}$.

The period ($t_{15}$–$t_{16}$) during which the output signal $S_{11}$ remains as "1" should be so sufficiently long as to trip the power circuit breaker $8_A$. The period $T_M$ can be, in effect, sufficiently secured because it is determined to be longer than the period between disconnection of signal transmission lines 4 caused by failures such as steel-tower destruction and the occurrence of ground short circuit of the transmission lines 1.

Although in this embodiment the case where the one-shot circuit is inserted has been described, it is not limited to this one-shot circuit, and it is obvious that any circuit would be satisfied as long as such a function is provided that produces the output for a certain specified period after reception of its input signal.

Figure 6:
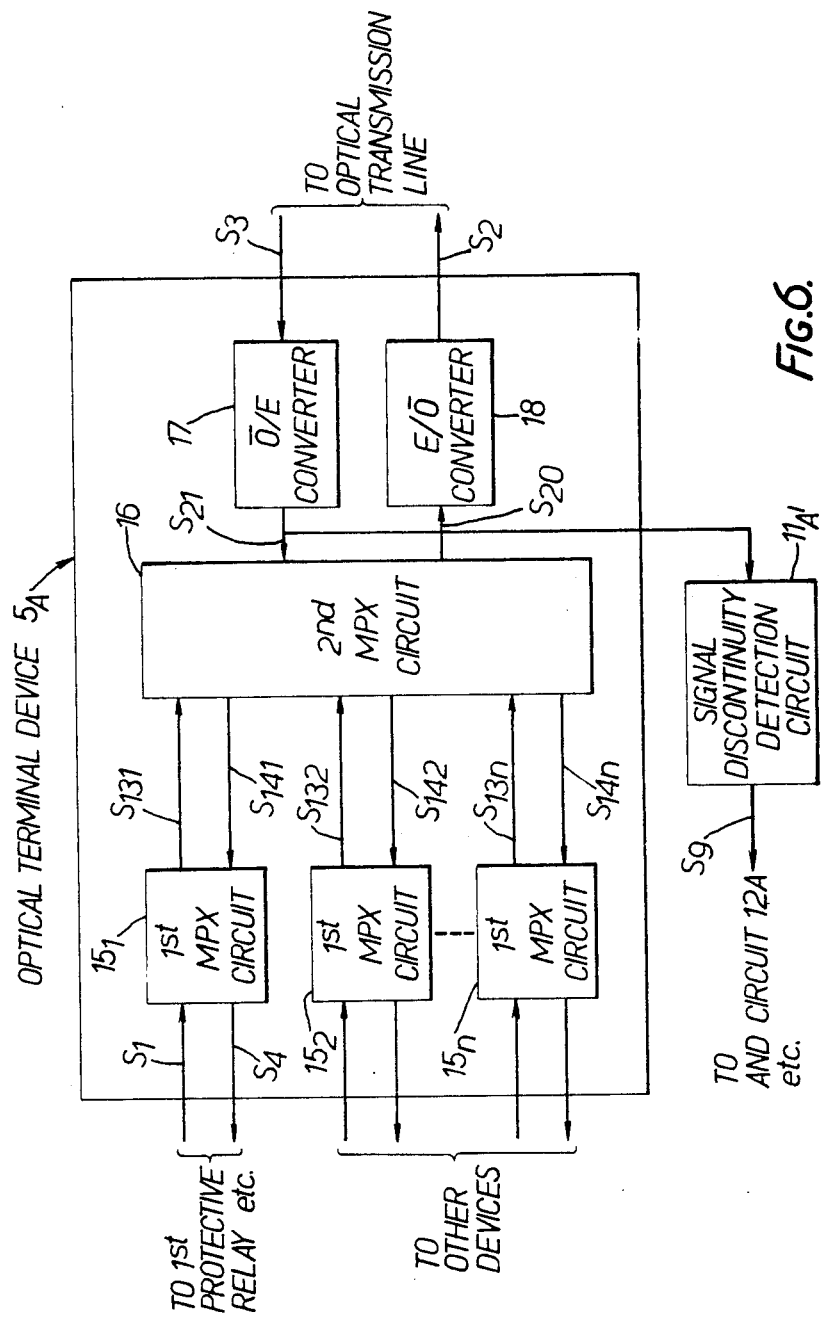
FIG. 6 is a schematic diagram illustrating a connection relationship between optical terminal device and signal discontinuity detection circuit in an embodiment.

FIG. 6 is a schematic diagram illustrating an embodiment of the connection relationship between an optical terminal device $5_A$ and a signal discontinuity detection circuit $11_A'$. In FIG. 6, the optical terminal device $5_{A1}$ includes first multiplex circuits $15_1$ through $15_n$, a second multiplex circuit 16, an optics-to-electricity conversion circuit (hereinafter simply referred to as $\overline{O/E}$ conversion circuit) 17 and an electricity-to-optics conversion circuit (hereinafter simply referred to as $E/\overline{O}$ conversion circuit) 18. The first multiplex circuit $15_1$ receive an output signal $S_1$ from the first protective relay $3_A$, and processes it in time sharing multiplex, thereby converting it into signals $S_{131}$, and further, at the same time, separating a signal $S_4$ from signals $S_{141}$ outputted from the second multiplex circuit 16. Here, the multiplex circuits $15_2$ through $15_n$ transmit and receive signals between other devices (not shown). The second multiplex circuit 16 receives the signals $S_{131}$ through $S_{13n}$ and processes them in time sharing multiplex, thereby converting into a signal $S_{20}$ and, at the same time, separates a signal $S_{21}$ into signals $S_{141}$ through $S_{14n}$. The $\overline{O/E}$ conversion circuit 17 receives an opposite side terminal signal $S_3$ through the optical transmission line 4, and converts it into an electrical signal $S_{21}$, in turn, outputs the same to the second multiplex circuit 16. The signal $S_{21}$ is also fed into a signal discontinuity detection circuit $11_A'$. On the other hand, the $E/\overline{O}$ conversion circuit 18 receives the signal $S_{20}$ which is an electrical signal from the second multiplex circuit 16, and converts it into an optical signal $S_2$, in turn, outputs the same.

As for the above-described optical terminal device, the first multiplex circuits $15_1$ through $15_n$ correspond to PCM-24 terminals, the signals $S_{131}$ through $S_{13n}$ and $S_{141}$ through $S_{14n}$ correspond to a PCM primary group (1.5 Mb/s), the signals $S_{20}$ and $S_{21}$ correspond to a PCM secondary group (6.3 Mb/s), and the second multiplex circuit 16 correspond to a PCM-6M multiplex conversion device, respectively. In this case, the signals $S_1$ and $S_4$ are designed to utilize voice-grade channels. Here, the signal discontinuity detection circuit $11_A'$ is so arranged as to directly receive the signal $S_{21}$, thereby permitting the circuit $11_A'$ to judge signals of higher transmission speed, i.e., signals of rapid variations compared to the signals of the signal discontinuity detection circuit $11_A$ in FIG. 2. Further, the first and second multiplex circuits $15_1$ through $15_n$ and 16 are not included within the detection region of the signal discontinuity detection circuit $11_A'$, so that the circuit $11_A'$ can detect signal discontinuity within such structural portions that have a high possibility of concurrence of optical transmission signal failures and power system failures, thereby reducing unnecessary responding operations of the signal discontinuity detection circuit $11_A'$.

In the above-described embodiment, signal discontinuity detection is performed by virtue of the signal discontinuity detection circuit $11_A'$ utilizing the signal $S_{21}$ from the $\overline{O/E}$ conversion circuit 17, however, it is obvious that such detection can also be performed by any one of the signals $S_{141}$ through $S_{14n}$ outputted from the second multiplex circuit 16. In general, multiplex conversion circuits incorporated within the optical terminal device $5_A$, that is, the first and second multiplex circuits are provided with functions of signal discontinuity detection within the respective circuits, thereby producing alarm outputs. Therefore, these alarm outputs may also be utilized as the enabling signals $S_9$.

Figure 7:
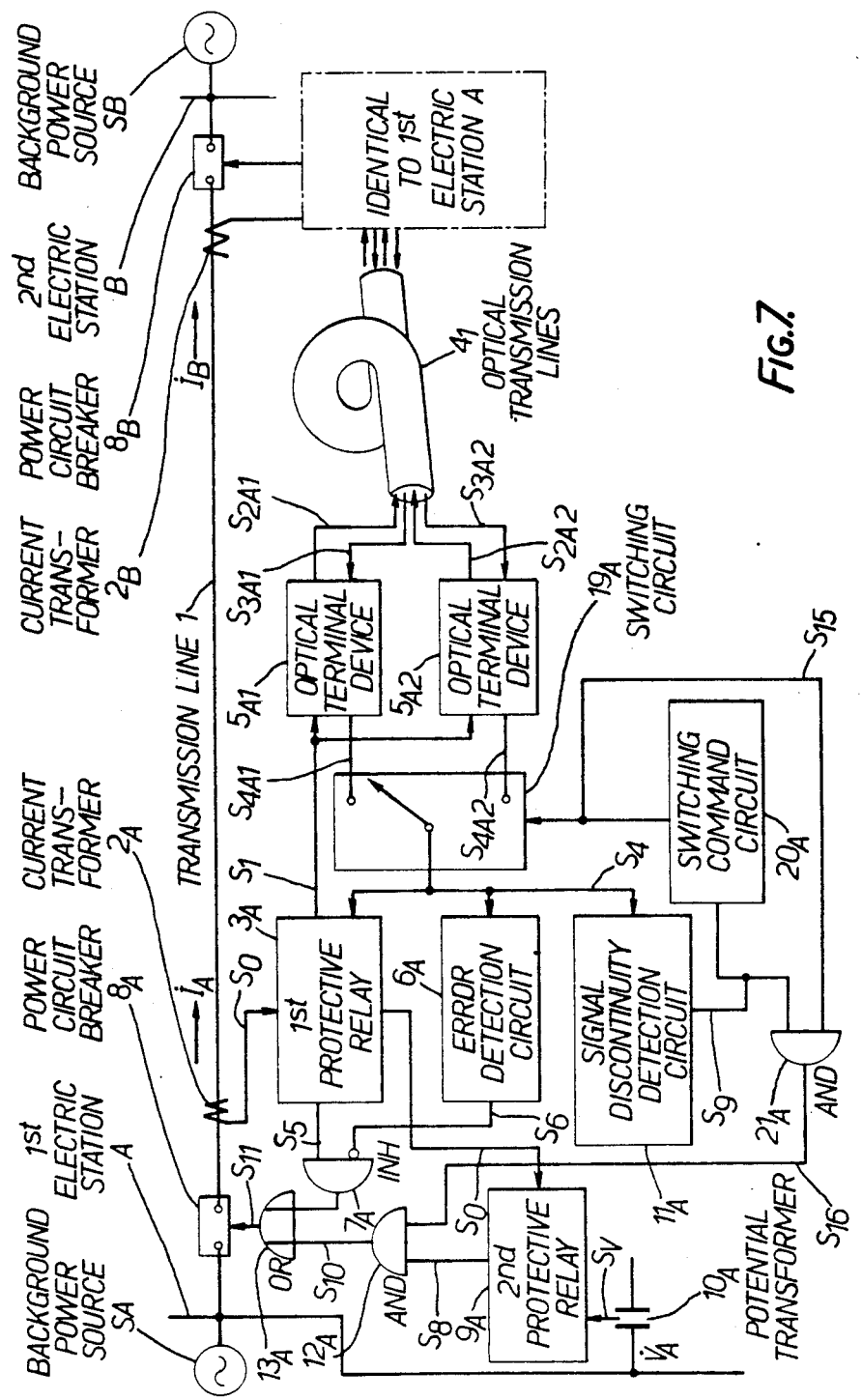
FIG. 7 is a schematic diagram illustrating another embodiment of a protective relaying system according to the present invention.

FIG. 7 shows another embodiment of a protective relaying system according to the present invention.

In this embodiment, optical terminal devices and optical transmission lines are designed in dual structure so as to enhance the system reliability.

In FIG. 7, reference numerals 1 through $13_A$ correspond to like reference numerals in FIG. 2. Optical terminal devices $5_{A1}$ and $5_{A2}$ are devices into which the optical terminal device $5_A$ is divided. The optical terminal device $5_{A1}$ which is usually in use, receives a signal $S_1$ and outputs an optical signal $S_{2A1}$ processed in multiplex conversion to an optical transmission lines $4_1$, while at the same time, receives an optical signal $S_{3A1}$ and separates it into a signal $S_{4A1}$, and, in turn, outputs the same. The optical terminal device $5_{A2}$ which in reverse, in the same manner as in the optical terminal device $5_{A1}$, receives the signal $S_1$ and outputs an optical signal $S_{2A2}$ processed in multiplex conversion to the optical transmission lines $4_1$, while at the same time, receives an optical signal $S_{3A1}$ and separates it into a signal $S_{4A2}$, and, in turn, outputs the same. Here, the optical transmission lines $4_1$ incorporates a four-optical-fiber cable for use in transmission of the signals $S_{2A1}$, $S_{2A2}$, $S_{3A1}$, and $S_{3A2}$. A switching circuit $19_A$, which is comprised of semiconductor elements, for example, receives the signals $S_{4A1}$ and $S_{4A2}$, respectively, and usually outputs the signal $S_{4A1}$ as a signal $S_4$, however, upon reception of a switching signal $S_{15}$ which will be described later in detail, the switching circuit $19_A$ rapidly switches the signal $S_{4A1}$ to the signal $S_{4A2}$ which is outputted as the signal $S_4$. A signal discontinuity detection circuit $11_A$ receives the signal $S_4$ so as to detect the discontinuity thereof and outputs a first enabling signal $S_9$ to a switching command circuit $20_A$ and an AND circuit $21_A$, respectively. The switching command circuit $20_A$ outputs, upon reception of the first enabling signal $S_9$, the switching signal $S_{15}$ to the switching circuit $19_A$ and the AND circuit $21_A$, respectively. When both the first enabling-signal $S_9$ and the switching signal $S_{15}$ are in "1", the AND circuit $21_A$ outputs a second enabling signal $S_{16}$ to an AND circuit $12_A$. The switching command circuit $20_A$ can readily be realized by use of, for example, a set/reset circuit with a set input of the first enabling signal $S_9$.

In operation, the optical terminal device $5_{A1}$ performs transmit/receive operation under normal conditions. In this case, the signals of transmission and reception are $S_{2A1}$ and $S_{3A1}$, respectively. In this state, when a signal discontinuity occurs in the signal $S_{4A1}$, the signal discontinuity detection circuit $11_A$ detects the discontinuity and outputs the first enabling signal $S_9$. On the other hand, the switching command circuit $20_A$, upon reception of this enabling signal $S_9$, outputs the switching signal $S_{15}$ to the switching circuit $19_A$ which, in turn, switches the use of the optical terminal device $5_{A1}$ to the use of the reserve optical terminal device $5_{A2}$ and then outputs the signal $4_{A2}$ as the signal $S_4$.

When the cause of signal discontinuity lies only in the signal $S_{3A1}$ i.e., the signal $S_{3A2}$ is normal, switching the optical terminal devices can cause the signal $S_4$ to be in a normal condition, so that the first enabling signal $S_9$ which is the output of the signal discontinuity detection circuit $11_A$ returns to "0" state. Therefore, in this case, the AND circuit $21_A$ receives only the switching signal $S_{15}$ as "1", and thus, the AND condition is not established, so that the second enabling signal $S_{16}$ is not outputted.

On the other hand, in the case where the optical transmission line $4_1$ is disconnected, even after switching of the optical terminal devices, the first enabling signal $S_9$ remains as "1". Thus, both the inputs of the AND circuit $21_A$, that is, the first enabling signal $S_9$ and the switching signal $S_{15}$ maintain "1". Thereby the second enabling signal $S_{16}$ is outputted as "1". Hereinafter, the operations according to the above-mentioned respective cases will be described.

In the system provided with the dual optical terminal devices and optical fiber cables, when both the signal transmission lines fall causing failure of signal discontinuity, it can be judged that the signal discontinuity has occurred in signal transmission line, so that unnecessary responding operations of the relay can be extremely suppressed. Further, in this embodiment, even when the multiplex system is structured in triplicate such, a method as dual structure judgments of signal discontinuity may similarly be employed.

Accordingly to this embodiment, when the signal discontinuity of the output signal $S_{4A1}$ from the optical terminal device $5_{A1}$ is detected, both the first enabling signal $S_9$ and the switching signal $S_{15}$ may become "1", in some cases, during a short period from the instant at which the switching signal $15_A$ is outputted until the instant at which the switching circuit $19_A$ completes the switching function. However, in the case where the overlapped time of the two signals $S_9$ and $S_{15}$ develops problems, the problems may be solved by providing, for instance, the AND circuit $21_A$ with a function of time limit operation.

Figure 8:
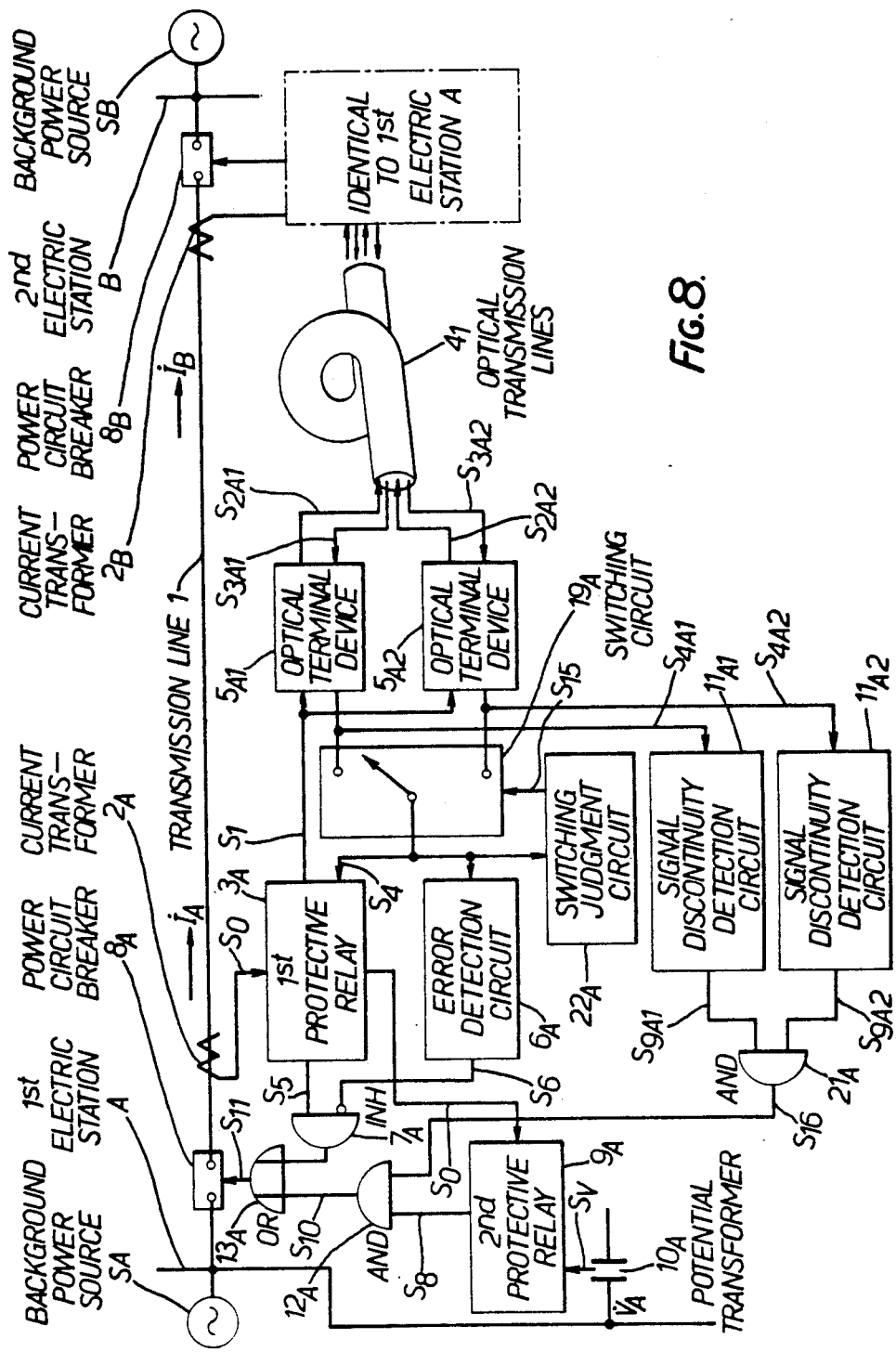
FIG. 8 and FIG. 9 are schematic diagrams illustrating yet another embodiment of a protective relaying system according to the present invention.
Figure 9:
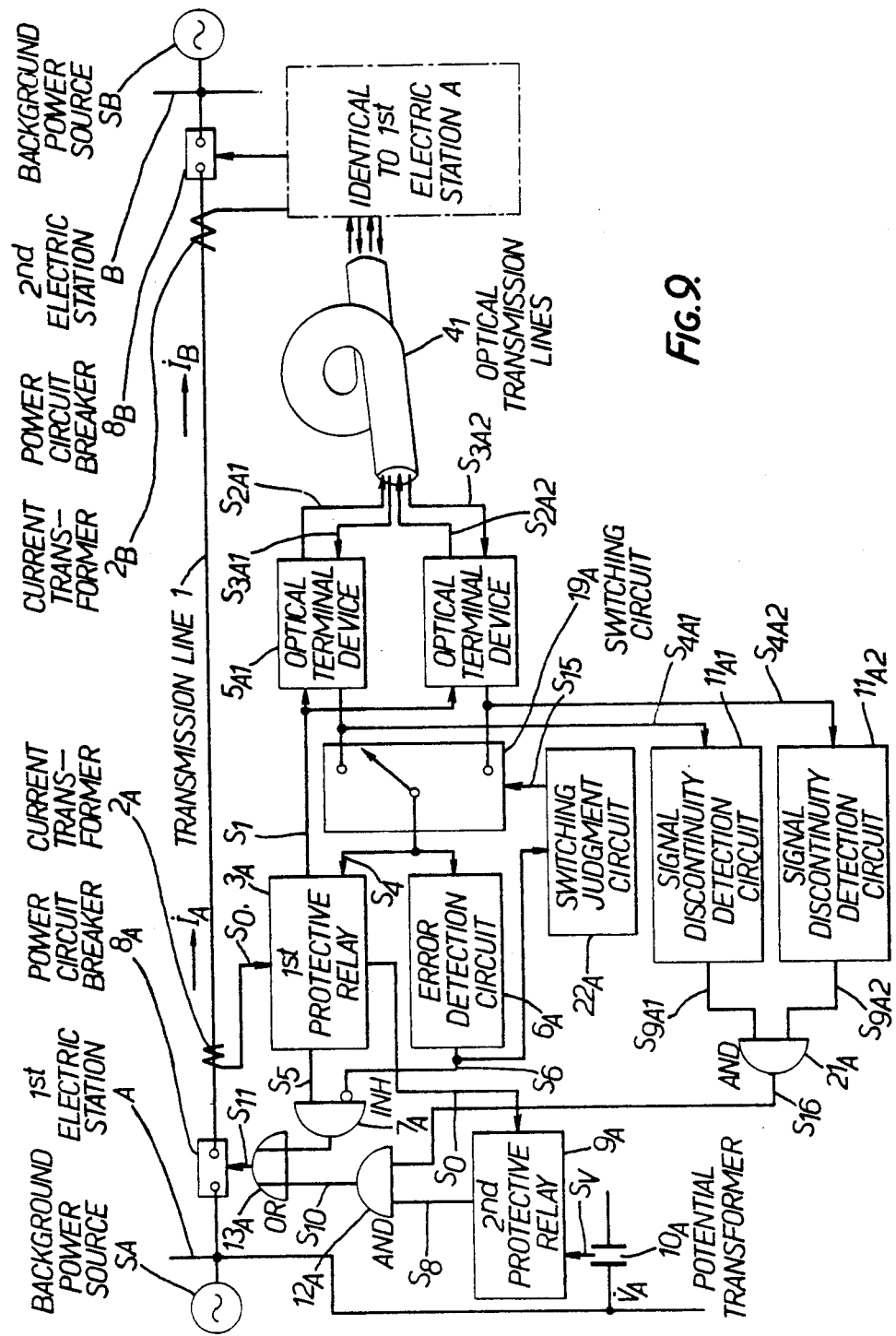

FIGS. 8 and 9 respectively show schematic diagrams of another embodiments of a protective relaying system according to the present invention, in which optical terminal devices and optical transmission lines are in dual structure in the same manner as described above.

In the the embodiment shown in FIG. 8, there is provided two signal discontinuity detection circuits so as to monitor optical transmission lines that include as to optical terminal devices, and when both signals $S_{4A1}$ and $S_{4A2}$ are judged as being in a signal discontinuity, a second enabling signal $S_{16}$ is outputted.

In FIG. 8, reference numerals 1 through $21_A$ correspond to like reference numerals in FIG. 7. A switching judgment circuit $22_A$ receives a signal $S_4$, and monitors the signal $S_4$ so as to check whether or not failures occur in optical transmission lines that include an output signal $S_{4A1}$ of an optical terminal device $5_{A1}$, which is usually in use, and a switching circuit $19_A$. When the optical terminal device $5_{A1}$ in use is judged to be unusable, the switching judgment circuit $22_A$ outputs a switching signal $S_{15}$ so as to switch the optical terminal device $5_{A1}$ to an optical terminal device $5_{A2}$ in reserve. Further, there are provided two signal discontinuity circuits $11_{A1}$ and $11_{A2}$ so as to respectively receive the output signals $S_{4A1}$ and $S_{4A2}$ of the optical terminal devices $5_{A1}$ and $5_{A2}$, and to respectively output enabling signals $S_{9A1}$ and $S_{9A2}$ to an AND circuit $21_A$. The AND circuit $21_A$ receives the enabling signals $S_{9A1}$ and $S_{9A2}$, and when both the signals are in "1" i.e., both the signals $S_{9A1}$ and $S_{9A2}$ are judged as in signal discontinuity, outputs a second enabling signal $S_{16}$.

The switching judgment circuit $22_A$, which is a conventionally used circuit, detects errors of the same type as to be detected by an error detection circuit $6_A$ and judges that such detections have frequently occurred or have invariably continued, and thereby outputs the switching signal $S_{15}$. Here, the switching judgment circuit $22_A$ is so arranged as to receive the signal $S_4$, however, it may also receive the signal $S_{4A1}$. The error detection method of the switching judgment circuit $22_A$ can be identical to that of the error detection circuit $6_A$ as described above. Thus, it is also possible that the switching judgment circuit $22_A$ receives the output $S_6$ of the error detection circuit $6_A$ so that the switching judgment circuit $22_A$ detects only error-occurrence frequency and error continuation time, as shown in the schematic diagram of the embodiment in FIG. 9.

In accordance with the above-described embodiments shown in FIGS. 8 and 9, the detections of signal discontinuity are executed at the respective optical terminals, so that switching-awaiting time is not needed. Consequently the second enabling signal can be rapidly outputted in response to the signal discontinuity of the optical transmission lines $4_1$.

In the embodiments described above with reference to FIGS. 7, 8 and 9 there are installed two pairs of optical transmission lines. However, it is obvious that the cables may also be one pair instead and that only the optical terminal devices are in dual structure. Further, even in the case where the dual terminal structure is modified into a multiterminal structure, the above-described method can also be employed.

Furthermore, the first protective relay $3_A$ has been explained as a current differential relay, however, this may also be substituted by a phase comparison relay or a direction comparison relay. This is because any relay that can respond to the electrical quantities of the both side terminals and judge whether or not a failure exists within a district to be protected can be used with the system. Similarly, the second protective relay $9_A$ may also be an overcurrent relay in place of a distance relay. The point is that there is no problem so long as the system failures can be detected.

Moreover, in the aforementioned embodiments, the respective devices have been explained as the individually discrete circuits, however, this is not limiting and, naturally, the first protective relay $3_A$, the second protective relay $9_A$ and the peripheral circuits thereof can be realized in an integral device with software processing by utilizing a protective relay which incorporates microcomputers, i.e., a so-called digital relay.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A protective relaying system for a transmission line between a first and a second electric station, said first electric station having a power circuit breaker connected in said transmission line and means for detecting a first electric quantity of said transmission line, said second electric station having means for detecting a second electric quantity of said transmission line, comprising:

optical transmission means provided between said first and second electric stations, including first optical terminal means provided at said first electric station for producing a first electrical signal, second optical terminal means provided at said second electric station connected to receive a second electrical signal corresponding to said second electrical quantity for converting said second electrical signal into an optical signal, and an optical transmission line connected between said first and second optical terminal means and connected to receive said optical signal from said second optical terminal means for transmitting said optical signal to said first optical terminal means, said first optical terminal means being connected to receive said optical signal from said optical transmission line for converting said optical signal into said first electrical signal;

first protective relaying means connected to receive said first electric quantity and said first electrical signal for detecting a failure in said transmission line based on said first electric quantity and said first electrical signal to produce a first relay output signal;

second protective relaying means connected to receive said first electric quantity for detecting said failure in said transmission line based on said first electric quantity to produce a second relay output signal;

error detection means connected to receive said first electrical signal for detecting an abnormality in said first electrical signal to produce a relay lock signal;

signal discontinuity detection means connected to receive said first electrical signal for detecting a discontinuity status in said first electrical signal to produce an enabling signal;

first logic circuit means connected to receive said first relay output signal and said relay lock signal for producing a first trip command when said first relay output signal indicates that said failure is detected and said relay lock signal indicates that said abnormality is not detected; and second logic circuit means connected to receive said second relay output signal and said enabling signal for producing a second trip command when said second relay output signal indicates that said failure is detected and said enabling signal indicates that said discontinuity status is detected;

said first and second trip commands being adapted to be connected to said power circuit breaker to trip said power circuit breaker.

2. The protective relaying system according to claim 1, wherein:

said signal discontinuity detection means produces said enabling signal only for a predetermined time period after said signal discontinuity detection means detects said discontinuity status in said first electrical signal.

3. The protective relaying system according to claim 2, wherein:

said signal discontinuity detection means further includes means connected to receive said enabling signal for producing a first enabling signal only for said predetermined time period after reception of said enabling signal;

said first enabling signal being applied to said second logic circuit means as said enabling signal.

4. The protective relaying system according to claim 1, wherein:

said first optical terminal means includes third and fourth optical terminal means for producing a third and a fourth electrical signals, respectively, as said first electrical signal;

said second optical terminal means includes fifth and sixth optical terminal means connected to receive said second electrical signal for converting said second electrical signal into a first and a second optical signals, respectively, as said optical signal; and said optical transmission line is connected to receive said first and second optical signals as said optical signal and transmits said first and second optical signals to said third and fourth optical terminal means, respectively;

said third and fourth optical terminal means receive said first and second optical signals and convert said first and second optical signals into said third and fourth electrical signals, respectively.

5. The protective relaying system according to claim 4, wherein:

said optical transmission line includes a first and a second optical transmission lines connected to receive said first and second optical signals for transmitting said first and second optical signals to said third and fourth optical terminal means, respectively.

6. The protective relaying system according to claim 4 or claim 5, further comprising:
  switching means connected to receive said third and fourth electrical signals from said optical transmission means for selecting one of said third and fourth electrical signals based on a switching signal to produce a selected electrical signal;
  wherein said selected electrical signal is applied to said error detection means and said signal discontinuity detection means as said first electrical signal;
  wherein said signal discontinuity detection means includes,
  a signal discontinuity detection circuit connected to receive said first electrical signal for detecting said discontinuity status in said first electrical signal to produce a first enabling signal,
  a switching command circuit connected to receive said first enabling signal for producing said switching signal based on said first enabling signal, and
  an AND circuit connected to receive said first enabling signal and said switching signal for producing said enabling signal; and
  wherein said switching means is further connected to receive said switching signal from said switching command circuit.

7. The protective relaying system according to claim 4 or claim 5, further comprising:
  switching means connected to receive said third and fourth electrical signals from said optical transmission means for selecting one of said third and fourth electrical signals based on a switching signal to produce a selected electrical signal;
  wherein said selected electrical signal is applied to said error detection means as said first electrical signal;
  wherein said signal discontinuity detection means receives said third and fourth electrical signals as said first electrical signal and includes a first and a second signal discontinuity detection circuits connected to receive said third and fourth electrical signals for detecting first and second discontinuity status in said third and fourth electrical signals to produce a first and a second enabling signals, respectively, and an AND circuit connected to receive said first and second enabling signals for producing said enabling signal.

8. The protective relaying system according to claim 7, further comprising:
  switching judgment means connected to receive said selected electrical signal for detecting an erroneous state of said selected electrical signal to produce said switching signal;
  wherein said switching means is further connected to receive said switching signal from said switching judgment means.

9. The protective relaying system according to claim 7, further comprising:
  switching judgment means connected to receive said relay lock signal from said error detection means for producing said switching signal based on said relay lock signal;
  wherein said switching means is further connected to receive said switching signal from said switching judgment means.

* * * * *